United States Patent
Bergner et al.

(10) Patent No.: US 10,219,088 B2
(45) Date of Patent: Feb. 26, 2019

(54) PHOTOACTIVE SELF-CLEANING HEARING ASSISTANCE DEVICE

(71) Applicant: Starkey Laboratories, Inc., Eden Prairie, MN (US)

(72) Inventors: Thomas Blaise Bergner, Minneapolis, MN (US); Sidney A. Higgins, Maple Grove, MN (US); Susan Marie Johansson, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 15/332,936

(22) Filed: Oct. 24, 2016

(65) Prior Publication Data

US 2018/0115843 A1    Apr. 26, 2018

(51) Int. Cl.
*H04R 25/00* (2006.01)
*B08B 7/00* (2006.01)
*G02B 5/00* (2006.01)

(52) U.S. Cl.
CPC ......... *H04R 25/654* (2013.01); *B08B 7/0057* (2013.01); *G02B 5/008* (2013.01); *H04R 25/65* (2013.01); *H04R 25/604* (2013.01); *H04R 2225/31* (2013.01); *H04R 2460/17* (2013.01)

(58) Field of Classification Search
CPC combination set(s) only.
See application file for complete search history.

(56) References Cited

U.S. PATENT DOCUMENTS

| | | | |
|---|---|---|---|
| 4,800,982 A | 1/1989 | Carlson | |
| 4,879,750 A | 11/1989 | Nassler | |
| 4,987,597 A | 1/1991 | Haertl | |
| 5,401,920 A | 3/1995 | Oliveira | |
| 6,349,790 B1 | 2/2002 | Brimhall | |
| 8,284,973 B2 | 10/2012 | Gabathuler et al. | |
| 8,670,586 B1* | 3/2014 | Boyle .................. | H04R 1/1008 381/189 |
| 8,693,719 B2 | 4/2014 | Higgins | |
| 9,002,023 B2* | 4/2015 | Gauger, Jr. .......... | H04R 29/001 381/328 |
| 9,108,880 B2 | 8/2015 | Jin et al. | |
| 9,363,613 B2 | 6/2016 | Bergner et al. | |
| 2003/0196687 A1 | 10/2003 | Campbell et al. | |
| 2004/0161445 A1 | 8/2004 | Bulk et al. | |
| 2005/0018866 A1 | 1/2005 | Schulein et al. | |

(Continued)

FOREIGN PATENT DOCUMENTS

WO    WO 2010/069312 A1    6/2010

OTHER PUBLICATIONS

Anderson et al., "Robust Nanostructured Silver and Copper Fabrics with Localized Surface Plasmon Resonance Property for Effective Visible Light Induced Reductive Catalysis," *Adv. Mater. Interfaces*, 2016; 3(1500632):1-8.

(Continued)

*Primary Examiner* — Amir Etesam
(74) *Attorney, Agent, or Firm* — Mueting, Raasch & Gebhardt, P.A.

(57) ABSTRACT

Photoactive cleaning hearing assistance devices and methods of cleaning hearing assistance devices are described. Photoactive nanoparticles may be disposed on or in the hearing assistance devices. The photoactive nanoparticles provide a localized surface plasmon resonance effect when illuminated with light.

16 Claims, 3 Drawing Sheets

(56) References Cited

U.S. PATENT DOCUMENTS

| | | | | |
|---|---|---|---|---|
| 2005/0164169 A1* | 7/2005 | Malak | ........................ | A61L 2/08 |
| | | | | 435/5 |
| 2009/0080679 A1* | 3/2009 | Rass | ........................ | H04R 1/12 |
| | | | | 381/322 |
| 2014/0334651 A1 | 11/2014 | Higgins et al. | | |

OTHER PUBLICATIONS

Zhou et al., "Photocatalysis in a packed bed: Degradation of organic dyes by immobilized silver nanoparticles," *Journal of Environmental Chemical Engineering*, 2015; 3:609-616.

Amendola et al., "Surface plasmon resonance in gold nanoparticles: a review," *Journal of Physics: Condensed Matter*, 2017; 29(20):203002, 48 pages.

Beciri, "Titanium dioxide coating + sunlight = self cleaning surfaces," *RobAid*, posted online Jul. 4, 2012. [Retrieved on Feb. 7, 2018]. Retrieved from the Internet:<URL:http://www.robaid.com/tech/titanium-dioxide-coating-sunlight-self-cleaning-surfaces.htm; 2 pgs.

Extended European Search Report for European Application No. 17192962.3, dated Feb. 15, 2018, 9 pages.

* cited by examiner

PHOTOACTIVE SELF-CLEANING HEARING ASSISTANCE DEVICE

BACKGROUND

Hearing assistance devices are prone to buildup of foreign material on the surfaces of the hearing assistance device or ingress into the hearing assistance device. The foreign material may affect the audio performance of the hearing assistance device. The foreign material is then cleaned off of the hearing assistance device or components of the hearing assistance device infiltrated with the foreign material are replaced.

One common foreign material associated with hearing assistance devices is cerumen ("earwax"). Cerumen is a yellowish wax-like substance that is produced by the ceruminous glands within the ear canal. Cerumen may occlude or ingress into a sound port or screen or fabric covering a sound port of the hearing assistance device. Cerumen is difficult to remove from hearing assistance devices. Cerumen buildup often results in replacement of parts of the hearing assistance device or complete replacement of the hearing assistance device.

SUMMARY

The present disclosure relates to photoactive self-cleaning hearing assistance devices. The present disclosure also relates to a system for photoactive self-cleaning a hearing assistance device. The present disclosure also relates to methods of photoactive cleaning foreign material from the hearing assistance device.

In one aspect, a hearing assistance device includes a housing, a transducer within the housing, a sound port extending through the housing, and a barrier layer covering the sound port. Photoactive nanoparticles are disposed on or in the housing or the barrier layer. The photoactive nanoparticles provide a localized surface plasmon resonance effect when illuminated with light.

In another aspect, a system includes an ultraviolet light source for generation of UV light, a chamber containing titanium dioxide in optical communication with the UV light for generating free radicals, and a hearing assistance device disposed within the chamber.

In another aspect, a method includes removing cerumen from a hearing assistance device by illuminating photoactive nanoparticles disposed on the hearing assistance device. The photoactive nanoparticles provide a localized surface plasmon resonance effect when illuminated with light.

In another aspect, a method includes placing a hearing assistance device in a chamber, the chamber comprising titanium dioxide, and illuminating the titanium dioxide with ultraviolet light to generate free radicals. Then the method includes contacting the free radicals with the hearing device to remove cerumen from the hearing assistance device.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
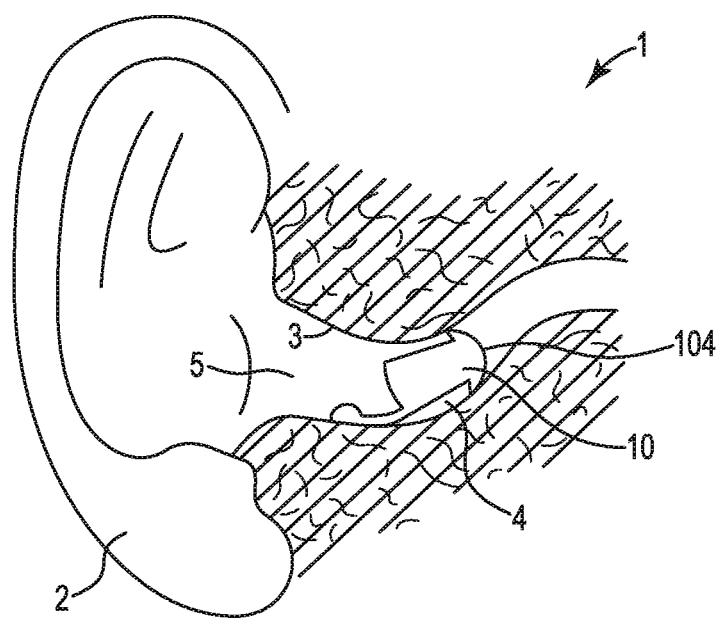
FIG. 1 is a schematic diagram of an illustrative hearing assistance device disposed in an ear canal.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

"Hearing assistance device" refers to any in-ear device that may transmit sound, such as a hearing aid, a personal sound amplification device, or a consumer electronic audio device, for example.

The present disclosure relates to self-cleaning hearing assistance devices. The self-cleaning hearing assistance devices may be photoactive self-cleaning hearing assistance devices. These self-cleaning hearing assistance devices may include photoactive nanoparticles that provide a localized surface plasmon resonance effect when illuminated with light. The localized surface plasmon resonance effect may degrade organic matter in contact with of adjacent to the photoactive nanoparticles. The localized surface plasmon resonance effect may degrade cerumen in contact with of adjacent to the photoactive nanoparticles. The localized surface plasmon resonance effect may release cerumen in contact with of adjacent to the photoactive nanoparticles, allowing the cerumen to fall off of the self-cleaning hearing assistance device. The photoactive nanoparticles may be incorporate into a screen or fabric barrier material covering ports in the hearing assistance device, such as a sound port associated with a microphone or receiver. The photoactive nanoparticles may be incorporated into a housing of the hearing assistance device. The hearing assistance device may include a light source. This light source may be configured to generate a localized surface plasmon resonance effect with the photoactive nanoparticles when illuminated. In another aspect, a system includes an ultraviolet light source for generation of UV light, a chamber containing titanium dioxide in optical communication with the UV light for generating free radicals, and a hearing assistance device disposed within the chamber. The free radicals may contact and degrade organic matter on or within the hearing assistance device. The free radicals may release the cerumen on or within the hearing assistance device, allowing the cerumen to fall off of the self-cleaning hearing assistance device. The free radicals may degrade cerumen on or within the hearing assistance device. The self-cleaning hearing assistance devices may be combined with the UV free radical cleaning system to further enhance the removal of organic material on or within the hearing assistance device. While the present disclosure is not so limited, an appreciation of various aspects of the disclosure will be gained through a discussion of the examples provided below.

Hearing assistance devices refers to any in-ear device that may transmit sound, such as a hearing aid, a personal sound amplification device, or a consumer electronic audio device, for example. Hearing assistance devices include a transducer. The transducer may be a microphone and/or a receiver (speaker). An acoustic barrier layer may cover a sound port associated with the transducer.

Different embodiments are provided in which photoactive nanoparticles are used to degrade or release foreign material from the hearing assistance device. The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used for devices with transducers generally, such as receivers for cochlear implant type hearing devices and such as deep insertion devices having a transducer, such as a receiver or microphone, whether custom fitted, standard, open fitted, or occlusive fitted. It is understood that other hearing assistance devices not expressly stated herein may be used in conjunction with the present subject matter. The present subject matter can be used with any device having an acoustic transducer, and especially one configured to be placed in or proximal the ear canal of a wearer.

FIG. 1 is a schematic diagram of an illustrative hearing assistance device 10 disposed in an ear canal 3. The illustrative hearing assistance device 10 is a completely-in-the-canal type hearing aid. It is understood that the hearing assistance device 10 is not limited to a CIC type device, but can be any hearing assistance device described herein. As illustrated, an ear 1 includes a pinna 2 and an ear canal 3, and the hearing assistance device 10 is placed in ear canal 3. The hearing assistance device 10 distal end portion 104 may shaped for placement at or just past a first bend 4, as past an aperture 5, of ear canal 3.

Figure 2:
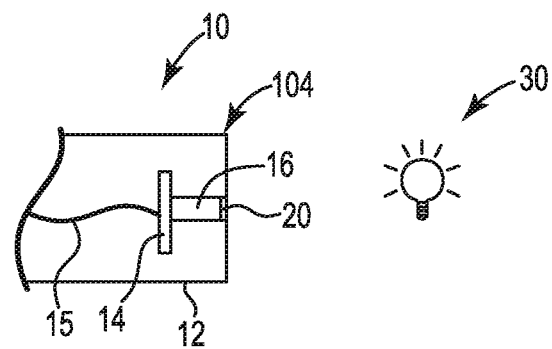
FIG. 2 is a schematic diagram side elevation view of a distal end portion of an illustrative hearing assistance device.

FIG. 2 is a schematic diagram side elevation view of a distal end portion 104 of an illustrative hearing assistance device 10. The hearing assistance device 10 includes a housing 12 and a transducer 14 within the housing 12. The housing may define an outer surface of the hearing assistance device 10. The housing 12 may be a multilayer structure including a rigid layer (such as metal or plastic) covered by a deformable layer (such as silicon or rubber). The transducer 14 may be a microphone or a receiver. The transducer 14 may be electrically coupled to electronics within the housing 12 or located outside of the housing 12.

A sound port 16 extends through the housing 12. The sound port 16 may be associated with the transducer 14 to transmit sound to or from the transducer 14. The transducer 14 may be within the sound port 16. A barrier layer 20 covers or fills at least a portion of the sound port 16 to prevent foreign material such as cerumen from entering the sound port 16. The barrier layer 20 may be screen or a fabric layer that allows sound to pass through the barrier layer 20. The barrier layer 20 may be a layer of acoustic fabric.

Photoactive nanoparticles may be disposed on or in the housing 12 or the barrier layer 20. The photoactive nanoparticles may provide a localized surface plasmon resonance effect when illuminated with light. It has been found that the conduction band electrons of silver, gold and copper nanoparticles can gain visible light energy through the localized surface plasmon resonance effect to produce energetic "hot" electrons facilitating the catalytic reaction process. The localized surface plasmon resonance effect may degrade organic matter in contact with of adjacent to the photoactive nanoparticles. The localized surface plasmon resonance effect may weaken the contact bond the organic matter has with the barrier layer 20 or housing 12 of the hearing assistance device 10.

The photoactive nanoparticles may have any useful size. The photoactive nanoparticles may have an average diameter in a range from 1 to 100 nanometers, or from 3 to 50 nanometers, or from 5 to 25 nanometers. The photoactive nanoparticles may be copper nanoparticles having a broad absorption peaks at about 500 nm to 600 nm. The photoactive nanoparticles may be silver nanoparticles having absorption peaks at about 400 nm to 450 nm.

The photoactive nanoparticles may be immobilized onto the housing 12. The photoactive nanoparticles may be immobilized onto the barrier layer 20. Silver and copper nanoparticles have been incorporated into fabric and exhibited a localized surface plasmon resonance effect when illuminated with visible light in the article "*Robust Nanostructured Silver and Copper Fabrics with Localized Surface Plasmon Resonance Property for Effective Visible Light Induced Reductive Catalysis*", Anderson, et al., Adv. Mater. Interfaces 2016, 3, 1500632. The photoactive nanoparticles may be uniformly embedded within the barrier layer 20 or housing 12.

A light source 30 is in optical communication with the photoactive nanoparticles. The light source 30 emits light at the absorption peak wavelength of the specific photoactive nanoparticles to generate a localized surface plasmon resonance effect. Preferably the light source 30 is a solid state light source. The solid state light source may be a light emitting diode or an organic light emitting diode, for example. The light source 30 may emit light having a wavelength in a range from about 500 nm to 600 nm when illuminating copper nanoparticles. The light source 30 may emit light having a wavelength in a range from about 400 nm to 450 nm when illuminating silver nanoparticles.

The light source 30 may form a portion of the hearing assistance device 10. The light source 30 may be disposed on or within the housing 12. The housing 12 or portions of the hearing assistance device 10 may be light transparent to the wavelength ranges emitted by the light source 30. This may provide illumination advantages for illuminating the photoactive nanoparticles embedded in the barrier layer 20 or housing 12 from an inside surface of the barrier layer 20 or housing 12.

Figure 3:
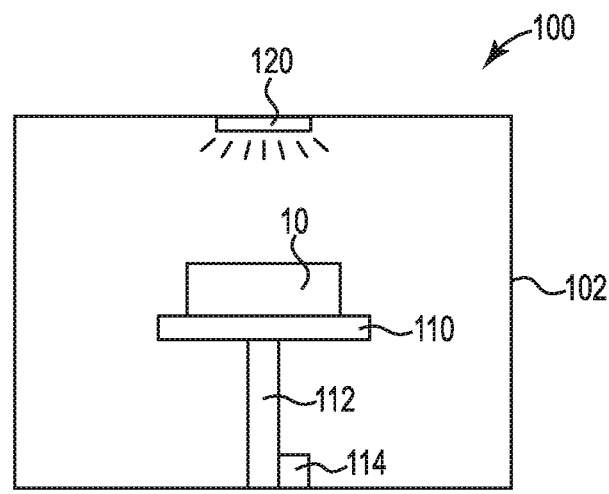
FIG. 3 is a schematic diagram side elevation view of an illustrative cleaning system.

FIG. 3 is a schematic diagram side elevation view of an illustrative cleaning system 100. The cleaning system 100 includes a chamber 102 that may contain and enclose a hearing assistance device 10. The chamber 102 may have any shape or configuration. The chamber 102 may have a lid to access the interior of the chamber 102.

The cleaning system 100 may include a platform for holding and charging the hearing assistance device 10. The hearing assistance device 10 may be electrically coupled to a charging element 112 configured to charge a power supply associated with the hearing assistance device 10. The cleaning system 100 may include a vibration element 114 configured to vibrate the hearing assistance device 10. Vibration of the hearing assistance device 10 can assist in removing foreign material (such as cerumen) from the hearing assistance device 10 that has been degraded by the illuminated photoactive nanoparticles embedded in the hearing assistance device 10.

A light source 120 may be disposed on or within the chamber 102. A light source 120 is in optical communication with the photoactive nanoparticles of the hearing assistance device 10. The light source 120 emits light at the absorption peak wavelength of the specific photoactive nanoparticles to generate a localized surface plasmon resonance effect. Preferably the light source 120 is a solid state light source.

In some embodiments the hearing assistance device 10 includes a light source. This light source may replace the chamber 102 light source 120 or be in addition to the chamber 102 light source 120. This light source may be disposed on or within the housing of the hearing assistance device 10. Illuminating both the chamber 102 light source 120 and the light source within the hearing assistance device 10 can provide illuminating to both the inside and outside surfaces of the hearing assistance device 10 and may increase the effectiveness of the localized surface plasmon resonance effect to remove foreign material (such as cerumen) from the hearing assistance device 10 that has been degraded by the illuminated photoactive nanoparticles embedded in the hearing assistance device 10.

Figure 4:
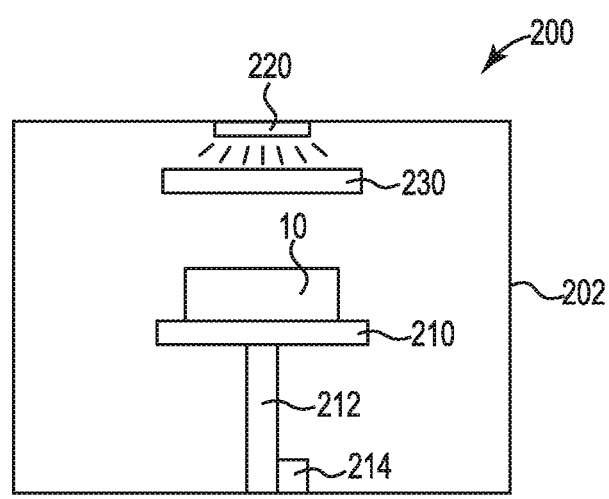
FIG. 4 is a schematic diagram side elevation view of another cleaning system.

FIG. 4 is a schematic diagram side elevation view of another cleaning system 200. This cleaning system may generate free radicals to degrade organic material adhered to or within the hearing assistance device 10. The cleaning system 200 includes an ultraviolet light source 220 for generation of UV light and a chamber 202 containing titanium dioxide 230 in optical communication with the UV light for generating free radicals. A hearing assistance device 10 is disposed within the chamber.

The cleaning system 200 chamber 202 may contain and enclose the hearing assistance device 10. The chamber 202 may have any shape or configuration. The chamber 202 may have a lid to access the interior of the chamber 202. Preferably the cleaning system 200 chamber 202 can be sealed to form an airtight seal and contain the free radicals.

The cleaning system 200 may include a platform for holding and charging the hearing assistance device 10. The hearing assistance device 10 may be electrically coupled to a charging element 212 configured to charge a power supply associated with the hearing assistance device 10. The cleaning system 200 may include a vibration element 214 configured to vibrate the hearing assistance device 10. Vibration of the hearing assistance device 10 can assist in removing foreign material (such as cerumen) from the hearing assistance device 10 that has been degraded by the free radicals produced from the illuminated titanium dioxide 230.

A UV light source 220 may be disposed on or within the chamber 202. The UV light source 220 is in optical communication with the titanium dioxide 230. The UV light source 220 emits UV light to generate free radicals from the titanium dioxide 230. Preferably the light source 120 is a solid state light source.

The hearing assistance device 10 may include photoactive nanoparticles embedded in the hearing assistance device 10, as described above. The UV light source 220 may emit a range of wavelengths at the absorption peak wavelength of the specific photoactive nanoparticles to generate a localized surface plasmon resonance effect. Thus, both the photoactive nanoparticles of the hearing assistance device 10 and the free radicals formed from the titanium dioxide 230 may degrade or release organic material or foreign material or cerumen from the hearing assistance device 10.

In some embodiments the hearing assistance device 10 further includes a light source. This light source may replace the chamber 202 light source 220 or be in addition to the chamber 202 light source 220. This light source may be disposed on or within the housing of the hearing assistance device 10. Illuminating both the chamber 202 light source 220 and the light source within the hearing assistance device 10 can provide illuminating to both the inside and outside surfaces of the hearing assistance device 10 and may increase the effectiveness of the localized surface plasmon resonance effect to remove foreign material (such as cerumen) from the hearing assistance device 10 that has been degraded by the illuminated photoactive nanoparticles embedded in the hearing assistance device 10 and by the free radicals.

Objects and advantages of this disclosure are further illustrated by the following examples, but the particular materials and amounts thereof recited in these examples, as well as other conditions and details, should not be construed to unduly limit this disclosure.

Thus, embodiments of PHOTOACTIVE SELF-CLEANING HEARING ASSISTANCE DEVICES are disclosed. Although reference is made to the accompanying set of drawings that form a part hereof and in which are shown by way of illustration several specific embodiments, it is to be understood that other embodiments are contemplated and may be made without departing from (e.g., still falling within) the scope or spirit of the present disclosure. The detailed description, therefore, is not to be taken in a limiting sense.

All references and publications cited herein are expressly incorporated herein by reference in their entirety into this disclosure, except to the extent they may directly contradict this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

Unless otherwise noted, all parts, percentages, ratios, etc. are by weight.

Terms related to orientation, such as "top", "bottom", "side", and "end", are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The phrases "at least one of," "comprises at least one of," and "one or more of" followed by a list refers to any one of the items in the list and any combination of two or more items in the list.

What is claimed is:

1. A hearing assistance device comprising: a housing; a transducer within the housing; a sound port extending through the housing; a barrier layer covering the sound port; photoactive nanoparticles disposed on or in the housing or the barrier layer, wherein the photoactive nanoparticles provide a localized surface plasmon resonance effect when illuminated with light; and a light source within the housing in optical communication with the photoactive nanoparticles.

2. The hearing assistance device according to claim 1, wherein the photoactive nanoparticles comprise silver.

3. The hearing assistance device according to claim 1, wherein the barrier layer comprises an acoustic fabric.

4. The hearing assistance device according to claim 1, wherein the transducer is a receiver within the sound port.

5. The hearing assistance device according to claim 1, wherein the transducer is a microphone within the sound port.

6. The hearing assistance device according to claim 1, wherein the light source is a solid state light source disposed within the housing.

7. The hearing assistance device according to claim 1, wherein the light source is configured to generate a localized surface plasmon resonance effect with the photoactive nanoparticles when illuminated.

8. The hearing assistance device according to claim 1, wherein the light source illuminates an inside surface of the housing.

9. The hearing assistance device according to claim 6, wherein the solid state light source is a light emitting diode.

10. The hearing assistance device according to claim 7, wherein the photoactive nanoparticles are UV photoactive nanoparticles.

11. The hearing assistance device according to claim 7, wherein the light source is configured to emit light having a wavelength in a range from 500-600 nanometers when illuminating copper nanoparticles.

12. The hearing assistance device according to claim 7, wherein the light source is configured to emit light having a wavelength in a range from 400-450 nanometers when illuminating silver nanoparticles.

13. The hearing assistance device according to claim 1, wherein the photoactive nanoparticles comprise copper.

14. The hearing assistance device according to claim 1, wherein the photoactive nanoparticles are a diameter from 3 to 50 nanometers.

15. The hearing assistance device according to claim 1, wherein the hearing assistance device further comprises a rechargeable battery.

16. The hearing assistance device according to claim 1, wherein the hearing assistance device is a hearing aid.

* * * * *